United States Patent Office 3,019,263
Patented Jan. 30, 1962

3,019,263
PROCESS FOR PREPARING 1-ACETYL-2,2,3-TRIMETHYLCYCLOBUTANE
Habib Emile Eschinazi, now by judicial change of name Emile Haviv Eschinasi, Montclair, N.J., assignor to The Givaudan Corporation, New York, N.Y., a corporation of New Jersey
No Drawing. Filed Apr. 2, 1959, Ser. No. 803,594
1 Claim. (Cl. 260—586)

This invention relates to the novel chemical 1-acetyl-2,2,3-trimethylcyclobutane and to a process for preparing it.

The novel material of this invention has the valuable property of being useful as a solvent for paints, lacquers and plasticizers, and especially as an intermediate in the preparation of chemicals of the orris-root type, such as irones, which are used in the perfume and pharmaceutical industries. The reaction sequence employed to convert the novel chemical of this invention to irones is represented in accepted abbreviated manner, as follows:

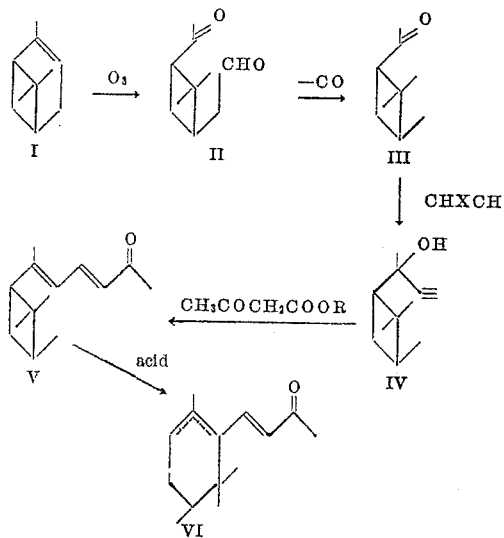

The names of the compounds represented by the Roman numerals in the foregoing sequence are as follows:

I. α-Pinene
II. Pinonic aldehyde
III. 1-acetyl-2,2,3-trimethylcyclobutane
IV. 3-(2,2,3-trimethylcyclobutyl)-but-1-yn-3-ol
V. 2-(2,2,3-trimethylcyclobutyl)-hepta-2,4-dien-6-one
VI. Irone.

Novel processes and/or novel products involved in the preparation of II, IV, V, and VI are disclosed and claimed in the following applications filed of even date herewith by the present applicant: Ser. No. 803,593; Ser. No. 803,565; Ser. No. 803,595 and Ser. No. 803,596; respectively.

The novel chemical of this invention is prepared by the decarbonylation of pinonic aldehyde in the presence of a suitable catalyst at elevated temperatures.

Suitable catalysts are palladium or Raney nickel. If desired, high boiling aromatic solvents may also be used, e.g., where excessively high temperatures are not desirable. Suitable solvents, such as xylene, should be inert under the conditions of the decarbonylation reaction.

The amount of catalyst which may be used is very small relative to the amount of pinonic aldehyde employed. From about 5 to about 1,000 parts of the active catalyst per million give satisfactory results; from about 50 to about 100 parts per million of the active catalyst being especially desirable.

If desired, the palladium catalyst may be used in different forms and over different carriers. For example, palladium hydroxide on barium sulfate may be used. It is obtained by making a slurry of barium sulfate in a solution of $PdCl_3$, and then precipitating the $Pd(OH)_3$ by alkalizing the mixture with soda ash. Palladium on charcoal may be used, if desired.

The concentration of the palladium on the carrier is not critical. It may be used in concentrations below 1% and above 10% but for practical reasons a concentration of about 3–5% of palladium on the carrier, such as charcoal, is preferred.

The palladium catalyst is recovered almost quantitatively and may be re-used repeatedly.

In preparing the novel chemical of this invention, sometimes referred to as "pinonone," pinonic aldehyde is heated, as aforesaid, until evolution of carbon monoxide ceases. For practical reasons, pinonic aldehyde is added continuously and the lower boiling pinonone of this invention is withdrawn continuously to avoid side reactions. Temperatures from about 100° C. to about 300° C. may be used, temperatures from about 180° C. to about 230° C. being preferred.

In order to illustrate this invention the following example is given, but not by way of limitation.

EXAMPLE

*a. Preparation of 2,2-dimethyl-3-acetylcyclobutylacetaldehyde*

136 g. of α-pinene, 120 ml. methanol and 60 ml. of water were placed in a 500 ml. reaction vessel cooled from the outside with an ice-water bath, while a stream of ozonized oxygen, from a commercial "Welsbach" T23 ozonator and containing approximately 70–75 mg. ozone per liter, was fed at the rate of 100 liters/hour through a glass, porous pipe dipped into the mixture. After about 7 hrs., the ozone started bleeding out with the outgoing gases and the ozonization was stopped. The reaction mixture was then transferred into a 2-liter flask equipped with a stirrer, a reflux condenser and a dropping funnel and containing 500 ml. water, 50 ml. benzene and 65 g. zinc dust. Then 160 g. 62% sulfuric acid was added under agitation within 5–10 minutes. The reaction mixture started to boil vigorously and was kept under agitation for 10 more minutes. After cooling, the layers are separated and the bottom layer extracted twice with 100 ml. benzene. The combined organic layers are now neutralized with soda ash and the solvent evaporated, leaving behind 140 g. of crude pinonic aldehyde showing a purity of approximately 90% by oximation.

Upon distillation in a 1½-ft. column, approximately 10% of a light cut is obtained followed by about 113 g. of pure pinonic aldehyde boiling at 93° at 3 mm., $n_D^{20}$ 1.4610, $\alpha_D$ 40° showing 98.5% purity by oximation.

*b. Preparation of 1-acetyl-2,2,3-trimethylcyclobutane*

Into a 3-necked flask provided with a stirrer, a thermometer, a dropping funnel and a short column with a reflux condenser, 35–40 ml. of pinonic aldehyde is introduced; then 0.5 g. of a 5% palladium on charcoal catalyst is added and the mixture heated under stirring to 200–230°. Carbon monoxide starts to be evolved and is measured by passing the liberated gases through a wet-test meter and then discharged into a very efficient hood (toxic CO). As soon as the gas evolution reaches about 2 liters, additional pinonic aldehyde is slowly introduced through the dropping funnel, while the light distillate of pinonone (below 150°) is collected.

The rate of addition of pinonic aldehyde is so adjusted, that it is approximately equal to the amount of distilled pinonone. The reaction temperature is maintained around 210–220°. 400 g. of pinonic aldehyde is thus introduced within 6–7 hrs., while 55 liters of CO are measured. The total amount of distillate reaches 305 g. and a slight vacuum applied towards the end results in an additional 5–10 g. distillate. The residue consists of about 30 g. of dark, heavy liquid from which the catalyst may be recovered.

The pure pinonone boils at 55–57° at 10 mm. pressure, $n_D^{20}$ 1.4400–1.4410. It consists of a mixture of cis and trans isomers. A semicarbazone M.P. 197–8 and a 2.4 dinitrophenyl hydrazone M.P. 201–202° were obtained from the distilled pinonone.

The foregoing illustrates the practice of this invention, which, however, is not to be limited thereby, but is to be construed and limited solely by the appended claim.

I claim:

The process for preparing 1-acetyl-2,2,3-trimethylcyclobutane, which comprises heating 2,2-dimethyl-3-acetylcyclobutylacetaldehyde in the presence of a catalyst selected from the group consisting of palladium and Raney nickel at a temperature from about 100° C. to about 300° C., while continuously withdrawing the desired 1-acetyl-2,2,3-trimethylcyclobutane from the reaction mixture.

References Cited in the file of this patent

Kazanskii et al.: Chem. Abstracts, vol. 47, p. 3247 (1953).

Migrdichian: Organic Synthesis, vol. I, p. 186 (1957).